US011878525B2

(12) United States Patent
Takabe et al.

(10) Patent No.: US 11,878,525 B2
(45) Date of Patent: Jan. 23, 2024

(54) LIQUID EJECTION HEAD AND LIQUID EJECTING APPARATUS

(71) Applicant: Seiko Epson Corporation, Tokyo (JP)

(72) Inventors: Motoki Takabe, Shiojiri (JP); Yasuhiro Itayama, Kai (JP); Masanori Mikoshiba, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 46 days.

(21) Appl. No.: 17/649,008

(22) Filed: Jan. 26, 2022

(65) Prior Publication Data

US 2022/0242120 A1 Aug. 4, 2022

(30) Foreign Application Priority Data

Jan. 29, 2021 (JP) ................................. 2021-012858

(51) Int. Cl.
*B41J 2/14* (2006.01)

(52) U.S. Cl.
CPC ................................. *B41J 2/14233* (2013.01)

(58) Field of Classification Search
CPC .......... B41J 2/14233; B41J 2002/14419; B41J 2202/11; B41J 2/045; B41J 2/161; B41J 2/01; B41J 2002/14258; B41J 2/1612; B41J 2/1607
See application file for complete search history.

(56) References Cited

FOREIGN PATENT DOCUMENTS

JP 2010-208204 9/2010

OTHER PUBLICATIONS

Yazaki, Shiro, EP3 330 086 A1. Liquid Ejecting Head, Liquid Ejecting Apparatus, and Piezoelectric Device, {Paragraphs 0031, 0036-0037, 0051-0055, 0057, 0096-0099] (Year: 2018).*

* cited by examiner

*Primary Examiner* — Lisa Solomon
(74) *Attorney, Agent, or Firm* — WORKMAN NYDEGGER

(57) ABSTRACT

A piezoelectric actuator includes, in a first direction in which pressure chambers are arranged side by side, an active portion in which a piezoelectric layer is sandwiched between a first electrode and a second electrode in a first area of a vibration plate corresponding to opposite ends of each pressure chamber and does not include the active portion in a second area of the vibration plate corresponding to a center of the pressure chamber. The vibration plate has, in the first direction, a thick-walled portion with a predetermined thickness in the first area and a thin-walled portion thinner than the thick-walled portion in the second area.

18 Claims, 10 Drawing Sheets

LIQUID EJECTION HEAD AND LIQUID EJECTING APPARATUS

The present application is based on, and claims priority from JP Application Serial Number 2021-012858, filed Jan. 29, 2021, the disclosure of which is hereby incorporated by reference herein in its entirety.

BACKGROUND

1. Technical Field

The present disclosure relates to liquid ejection heads that eject liquid from nozzles and to liquid ejecting apparatuses, and in particular, to an ink-jet recording head that ejects ink as liquid as well as an ink-jet recording apparatus.

2. Related Art

A known example of the ink-jet recording head that ejects ink includes a piezoelectric actuator on a channel-formed substrate in which pressure chambers are provided, with a vibration plate disposed therebetween. A known example of the piezoelectric actuator is formed by laminating a first electrode, a piezoelectric layer, and a second electrode from the vibration plate side. In an example of the configuration of the piezoelectric actuator, active portions in each of which a piezoelectric layer is sandwiched between a first electrode and a second electrode are provided at opposite ends of each pressure chamber in a direction in which the pressure chambers are arranged and no active portion is provided at the center of the pressure chamber (for example, JP-A-2010-208204).

This configuration of the piezoelectric actuator increases the amount of displacement of the vibration plate caused by driving the piezoelectric actuator. However, the amount of displacement of the vibration plate is not enough, which may cause the problem of difficulty in ejecting large drops of ink. To increase the amount of displacement of the vibration plate, the vibration plate may be decreased in thickness. This however may generate cracks in the vibration plate.

Such problems occur not only in ink-jet recording heads but also in liquid ejection heads that eject liquid other than ink.

SUMMARY

A liquid ejection head according to an aspect of the present disclosure includes a channel-formed substrate in which a plurality of pressure chambers communicating with nozzles are arranged side by side, a vibration plate on one surface of the channel-formed substrate, and a piezoelectric actuator including a first electrode, a piezoelectric layer, and a second electrode laminated on a surface of the vibration plate remote from the pressure chambers, wherein the piezoelectric actuator includes, in a first direction in which the pressure chambers are arranged side by side, an active portion in which the piezoelectric layer is sandwiched between the first electrode and the second electrode in a first area of the vibration plate corresponding to opposite ends of each pressure chamber and does not include the active portion in a second area of the vibration plate corresponding to a center of the pressure chamber, and wherein the vibration plate has, in the first direction, a thick-walled portion with a predetermined thickness in the first area and a thin-walled portion thinner than the thick-walled portion in the second area.

Another aspect of the present disclosure is a liquid ejecting apparatus including the liquid ejection head according to the above aspect.

DESCRIPTION OF EXEMPLARY EMBODIMENTS

Figure 1:
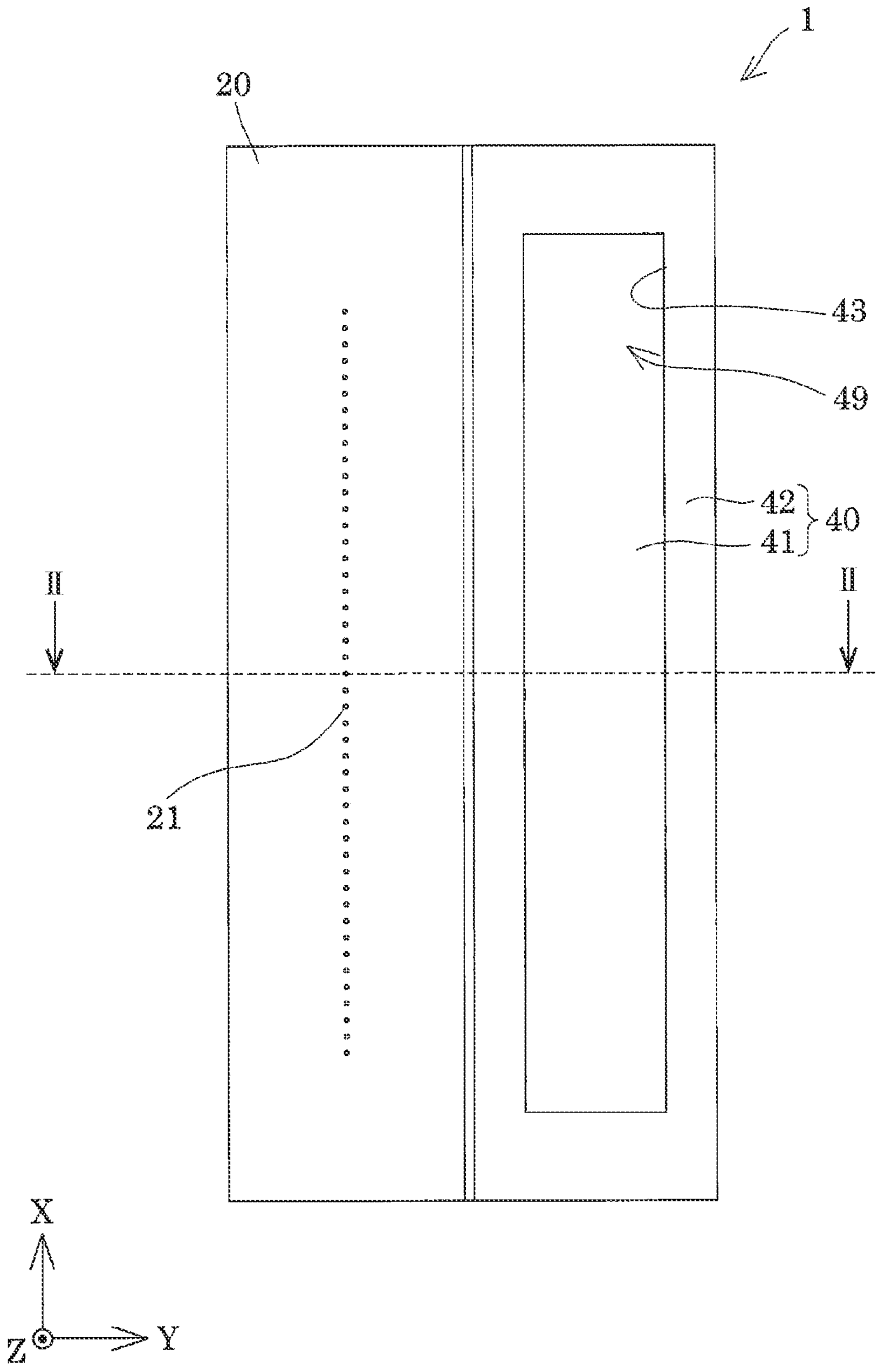
FIG. 1 is a plan view of a recording head according to a first embodiment of the present disclosure.

The present disclosure will be described in detail hereinbelow with reference to embodiments. Note that the following description is about an aspect of the present disclosure, and the configuration of the present disclosure can be freely changed within the scope of the present disclosure. The same components are denoted by the same reference signs throughout the drawings, and redundant descriptions will be omitted.

Reference signs X, Y, and Z in the drawings denote three spatial axes perpendicular to one another. In this specification, the directions along these axes are referred to as X-direction, Y-direction, and Z-direction, respectively. The direction indicated by the arrow in each drawing is positive (+) direction, and the opposite direction from the arrow is negative (−) direction. The Z-direction indicates the vertical direction, +Z-direction direction indicates a vertically downward direction, and −Z-direction indicates a vertically upward direction. Three spatial axes X, Y, and Z irrespective of whether they are positive direction or the negative direction will be described as X-axis, Y-axis, and Z-axis, respectively.

First Embodiment

Figure 2:
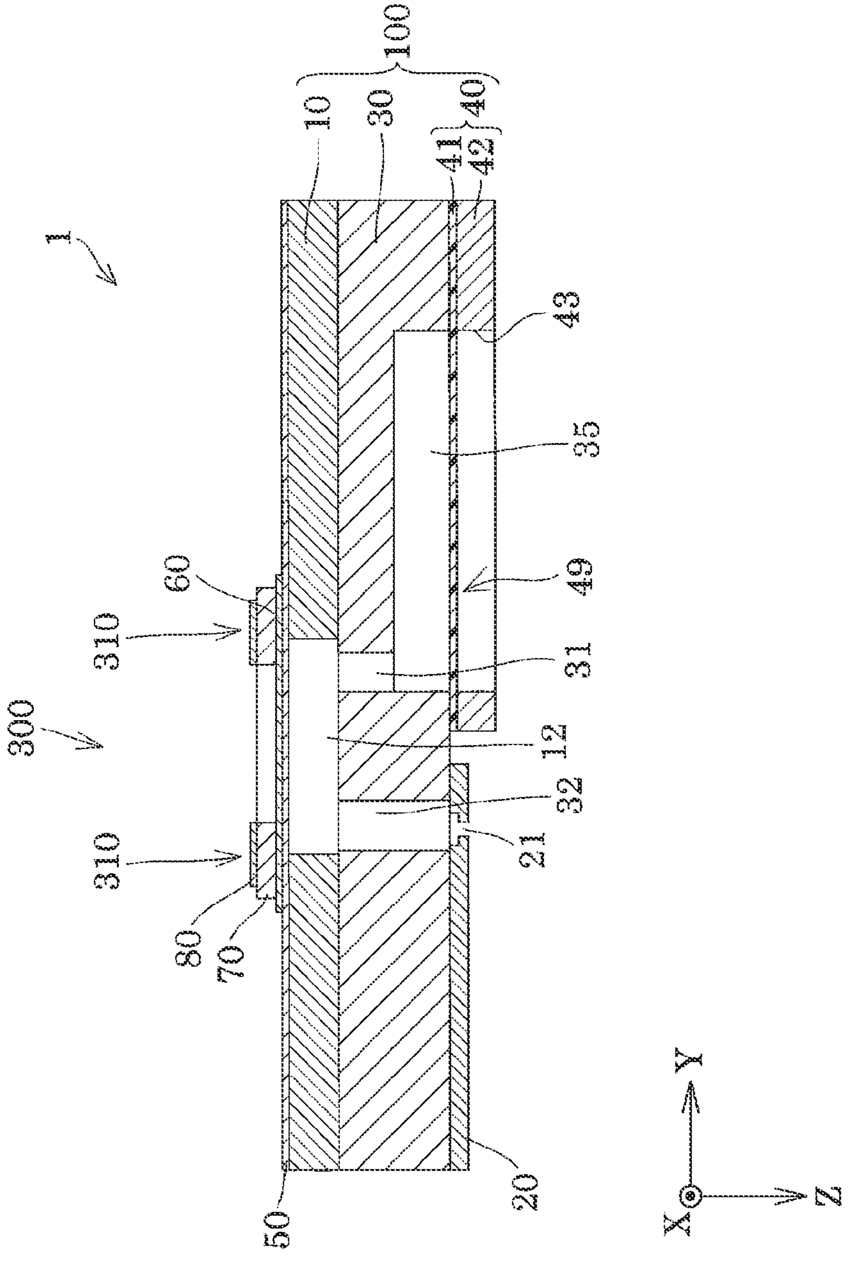
FIG. 2 is a cross-sectional view of the recording head according to the first embodiment of the present disclosure.
Figure 3:
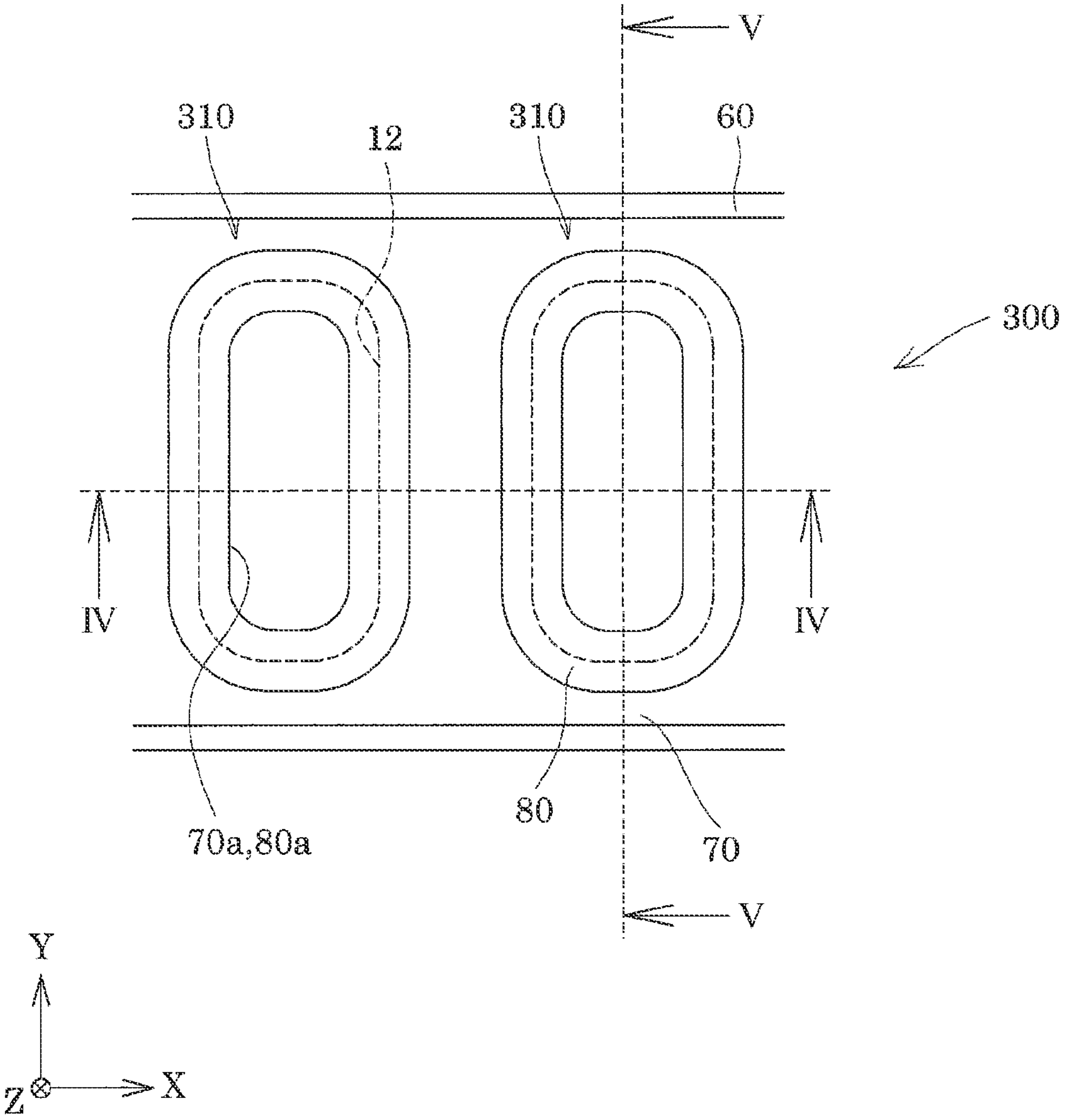
FIG. 3 is a plan view of the relevant part of the recording head according to the first embodiment of the present disclosure.
Figure 4:
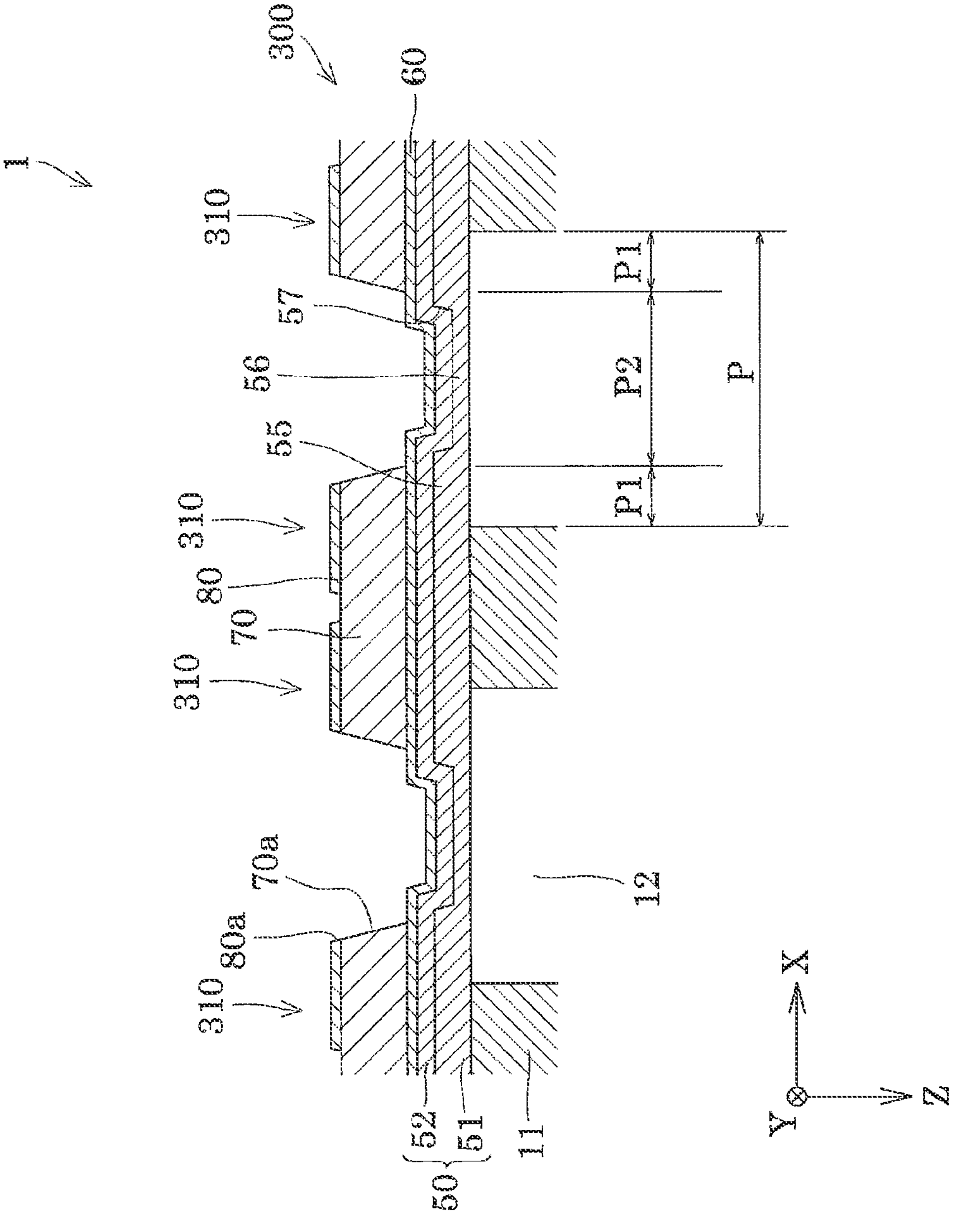
FIG. 4 is a cross-sectional view of the relevant part of the recording head according to the first embodiment of the present disclosure.
Figure 5:
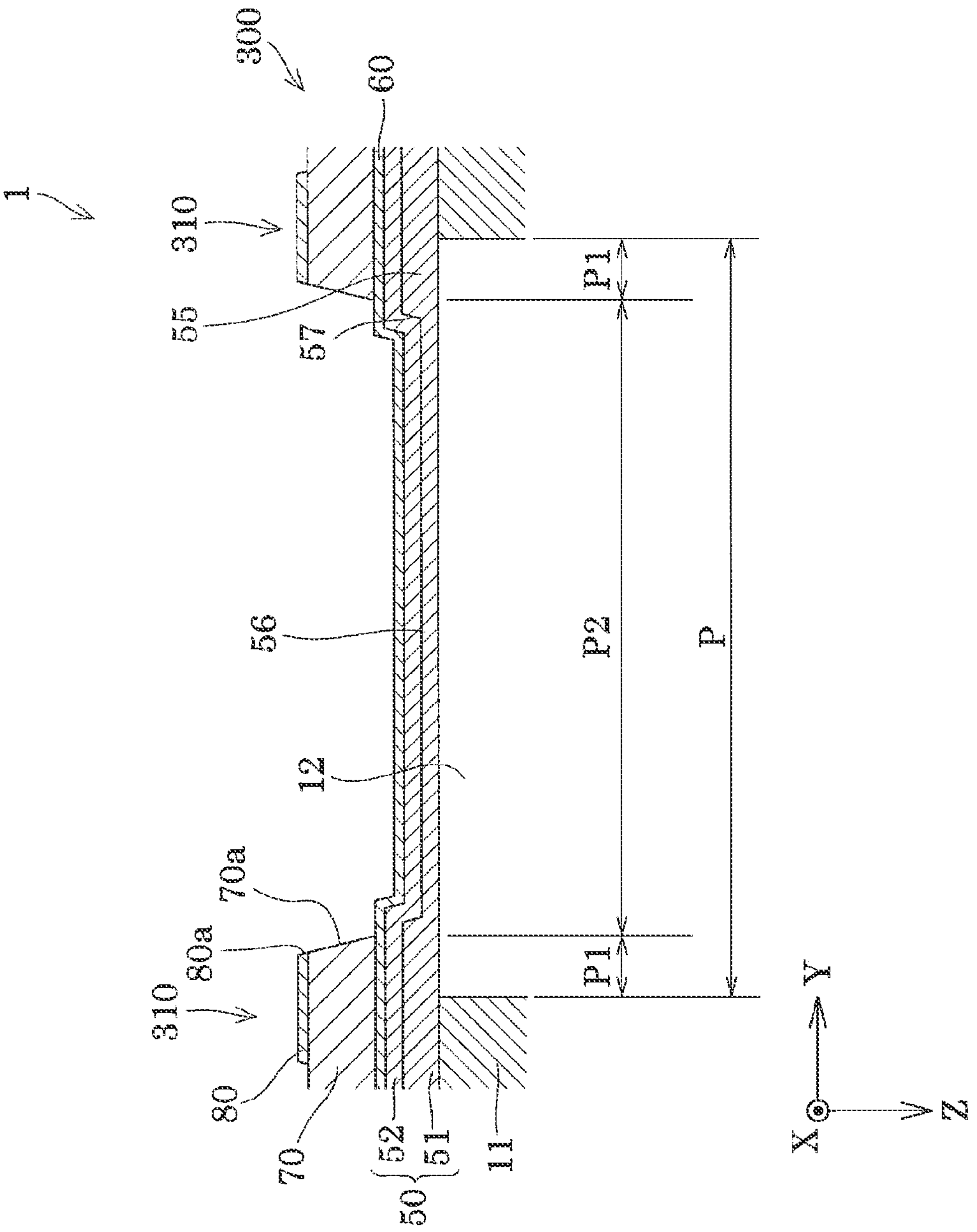
FIG. 5 is a cross-sectional view of the relevant part of the recording head according to the first embodiment of the present disclosure.

FIG. 1 is a plan view of an ink-jet recording head (hereinafter simply referred to as “recording head”), which is an example of a liquid ejection head according to a first embodiment of the present disclosure, viewed from a nozzle plane side. FIG. 2 is a cross-sectional view taken along line II-II in FIG. 1. FIG. 3 is an enlarged plan view of the relevant part of a piezoelectric actuator installed in the recording head. FIG. 4 is a cross-sectional view taken along line IV-IV in FIG. 3. FIG. 5 is a cross-sectional view taken along line V-V in FIG. 3.

As is shown in the drawings, the recording head 1 includes a channel unit 100, a vibration plate 50, and a piezoelectric actuator 300. The channel unit 100 of this embodiment includes a channel-formed substrate 10, a common liquid chamber substrate 30, a nozzle plate 20, and a compliance substrate 40.

The channel-formed substrate 10 is made of a silicon substrate, a glass substrate, a silicon-on-insulator (SOI) substrate, or a ceramic substrate.

The channel-formed substrate 10 includes a plurality of pressure chambers 12 segmented by partitions 11 arranged along the X-axis. In other words, the plurality of pressure chambers 12 are arranged side by side in the lateral direction in the channel-formed substrate 10 and are separated by partitions 11. The pressure chambers 12 are arranged on a straight line along the X-axis so as to be aligned in the Y-axis direction. Of course, the arrangement of the pressure chambers 12 is not limited to particular arrangement. For example, the pressure chambers 12 arranged side by side in the X-axis direction may be alternately displaced (in a staggered configuration) in the Y-axis direction.

Each pressure chamber 12 has a rectangular shape that is long in the Y-axis direction and semicircular at opposite ends in the Y-axis direction, as viewed in the Z-axis direction. In other words, each pressure chamber 12 has a round corner rectangular shape (a track shape) viewed in the Z-axis direction. In other words, each pressure chamber 12 has a long shape that is long when viewed in the Z-axis direction and is short in the X-axis direction. The long shape of the pressure chamber 12 allows the plurality of pressure chambers 12 to be arranged close to each other while ensuring a sufficient capacity of each pressure chamber 12.

Of course, the shape of the pressure chamber 12 viewed in the Z-axis direction is not limited to a particular shape. For example, the pressure chamber 12 may have a square shape, a rectangular shape, a polygonal shape, a parallel quadrilateral shape, a fan shape, a circular shape, or a long-hole shape. The long-hole shape includes an elliptical shape, an oval shape, and an oblong-elliptical shape.

The surface of the channel-formed substrate 10 on the positive side in the Z-direction is joined to the common liquid chamber substrate 30 with an adhesive. The common liquid chamber substrate 30 includes a common liquid chamber 35 communicating with the pressure chambers 12 is provided. The common liquid chamber 35 is provided continuously in the X-axis direction across an area corresponding to the plurality of pressure chambers 12 arranged side by side. The common liquid chamber 35 is disposed at a position aligned, in the Z-axis direction, with ends of the pressure chambers 12 on the positive side in the Y-direction. This common liquid chamber 35 is open to the surface of the common liquid chamber substrate 30 on the positive side in the Z-direction.

The common liquid chamber substrate 30 further includes a first channel 31 communicating with the vicinity of the end of each pressure chamber 12 on the positive side in the Y-direction. The first channel 31 is independently provided for each of the pressure chambers 12. The first channel 31 communicates the common liquid chamber 35 with the pressure chamber 12 in the Z-axis direction to supply the ink in the common liquid chamber 35 to the pressure chamber 12.

The common liquid chamber substrate 30 further includes a second channel 32 communicating with the vicinity of the end of each pressure chamber 12 on the negative side in the Y-direction. The second channel 32 is independently provided for each of the pressure chambers 12. The second channel 32 communicates the pressure chamber 12 with the nozzle 21 to supply the ink in the pressure chamber 12 to the nozzle 21 and passes through the common liquid chamber substrate 30 in the Z-axis direction.

Examples of a material for the common liquid chamber substrate 30 include a silicon substrate, a glass substrate, an SOI substrate, various ceramic substrates, and a metal substrate, such as a stainless substrate. A material for the common liquid chamber substrate 30 may have substantially the same coefficient of thermal expansion as that of the channel-formed substrate 10. This reduces or eliminates occurrence of warpage caused by heat due to the difference in thermal expansion coefficient between the channel-formed substrate 10 and the common liquid chamber substrate 30.

The nozzle plate 20 is joined to the surface of the common liquid chamber substrate 30 remote from the channel-formed substrate 10, that is, on the positive side in the Z-direction.

The nozzle plate 20 has the multiple nozzles 21 that eject ink in the +Z-direction. In this embodiment, the nozzles 21 are arranged on a straight line along the X-axis, as shown in FIG. 1. In other words, the nozzles 21 are arranged at the same position in the Y-axis direction. The arrangement of the nozzles 21 is not limited to particular arrangement. For example, the nozzles 21 arranged side by side in the X-axis direction may be alternately displaced (in a staggered configuration) in the Y-axis direction.

Examples of a material for the nozzle plate 20 include a silicon substrate, a glass substrate, an SOI substrate, various ceramic substrates, a metal substrate, such as a stainless substrate, and an organic substance, such as a polyimide resin. A material for the nozzle plate 20 may have substantially the same coefficient of thermal expansion as that of the communication plate 15. This reduces or eliminates occurrence of warpage caused by heat due to the difference in thermal expansion coefficient between the nozzle plate 20 and the communication plate 15.

The compliance substrate 40 is joined to the surface of the common liquid chamber substrate 30 remote from the channel-formed substrate 10 together with the nozzle plate 20. The compliance substrate 40 is joined to the portion of the common liquid chamber substrate 30 at which the common liquid chamber 35 is open to seal the opening of the common liquid chamber 35 on the positive side in the Z-direction. This compliance substrate 40 in this embodiment includes a sealing film 41 which is a flexible thin film and a fixed substrate 42 made of a hard material, such as metal. The area of the fixed substrate 42 facing the common liquid chamber 35 is an opening 43 in which the fixed substrate 42 is completely removed in the thickness direction. Accordingly, one surface of the common liquid chamber 35 constitutes a compliance portion 49 which is a flexible portion sealed by only the flexible sealing film 41. Disposing the compliance portion 49 at part of the wall of the common liquid chamber 35 allows absorbing pressure fluctuation of the ink in the common liquid chamber 35 by the deformation of the compliance portion 49.

Thus, the channel unit 100 has an ink channel from the common liquid chamber 35 to the nozzle 21 through the first channel 31, the pressure chamber 12, and the second channel 32. The common liquid chamber 35 is configured to be supplied with ink from an external ink supply unit (not shown).

When the common liquid chamber 35 is supplied with ink from the ink supply unit, the ink in the common liquid chamber 35 is supplied to the individual pressure chambers 12 as appropriate through the individual first channels 31. The ink in the pressure chambers 12 is ejected by the piezoelectric actuator 300 from the nozzles 21 through the second channels 32.

The piezoelectric actuator 300 is disposed on the surface of the channel-formed substrate 10 remote from the nozzle plate 20 and so on with the vibration plate 50 therebetween.

The vibration plate 50 has a plurality of films laminated in the thickness direction. Specifically, the vibration plate 50 according to this embodiment includes two layers, a first vibration plate 51 and a second vibration plate 52. The first vibration plate 51 and the second vibration plate 52 are layered in this order in the −Z-direction.

The first vibration plate 51 is a film containing silicon oxide and is disposed on the surface of the channel-formed substrate 10 on the negative side in the Z-direction. The second vibration plate 52 is a film containing zirconium oxide and is disposed on the surface of the first vibration plate 51 on the negative side in the Z-direction. The pressure chambers 12 pass through the channel-formed substrate 10. The surface of the pressure chambers 12 on the negative side in the Z-direction is formed of the first vibration plate 51 of the vibration plate 50.

The vibration plate 50 has a thick-walled portion 55 with a predetermined thickness at an area corresponding to the end of the pressure chamber 12 and a thin-walled portion 56 thinner than the thick-walled portion 55 at an area corresponding to the center of the pressure chamber 12 (described in detail below).

The configuration of the vibration plate 50 is not limited to the one described above. The vibration plate 50 may include one of the first vibration plate 51 and the second vibration plate 52 or may include another film other than the first vibration plate 51 and the second vibration plate 52. Examples of a material for the other film include silicon and silicon nitride.

The piezoelectric actuator 300 is disposed on the surface of the vibration plate 50 adjacent to the second vibration plate 52, that is, the surface remote from the pressure chambers 12. The piezoelectric actuator 300 includes a first electrode 60, a piezoelectric layer 70, and a second electrode 80 laminated by film deposition and lithography.

The portion of the piezoelectric actuator 300 at which piezoelectric strain occurs in the piezoelectric layer 70 when a voltage is applied between the first electrode 60 and the second electrode 80 is referred to as an active portion 310. In other words, the active portion 310 is the portion of the piezoelectric actuator 300 at which the piezoelectric layer 70 is sandwiched between the first electrode 60 and the second electrode 80. The active portion 310 is provided independently for each pressure chamber 12.

In general, the active portion 310 is configured such that one electrode serves as an individual electrode that is independent for each active portion 310, and the other electrode serves as a common electrode common to the plurality of active portions 310. In this embodiment, the first electrode 60 constitutes the common electrode, and the second electrode 80 constitutes the individual electrode.

An area of the vibration plate 50 that is deflected when the piezoelectric actuator 300 is driven, that is, an area facing the pressure chamber 12, is referred to as a flexible area P. Of the flexible area P, a ring-shaped area corresponding to the end (edge) of the pressure chamber 12 viewed in the +Z-direction is referred to as a first area P1. Of the flexible area P, the area corresponding to the center of the pressure chambers 12, that is, the area inside the first area P1, is referred to as a second area P2.

In this embodiment, the active portion 310 of the piezoelectric actuator 300 is disposed in the first area P1 of the vibration plate 50, not in the second area P2, in plan view in the Z-axis direction. In other words, the active portion 310 of the piezoelectric actuator 300 is disposed in a ring shape along the end of each pressure chamber 12.

As a result, as shown in FIG. 4, the active portion 310 of the piezoelectric actuator 300 is disposed in the first area P1 of the vibration plate 50 corresponding to the opposite ends of the pressure chamber 12 but is not disposed in the second area P2 of the vibration plate 50 corresponding to the center of the pressure chamber 12 in a first direction, which is the direction of arrangement of the pressure chambers 12, which is the X-axis direction in this embodiment.

As shown in FIG. 5, also in a second direction crossing the X-direction, which is the first direction, in the Y-axis direction which is the longitudinal direction of the pressure chamber 12 in this embodiment, the active portion 310 of the piezoelectric actuator 300 is disposed in the first area P1 corresponding to the opposite ends of the pressure chamber 12 but is not disposed in the second area P2 corresponding to the center of the pressure chamber 12.

The active portion 310 of the piezoelectric actuator 300 extends to the outside of the first area P1, that is, to the outside of the pressure chamber 12 in both of the X-axis direction and the Y-axis direction.

The first electrode 60 that constitutes the common electrode of the piezoelectric actuator 300 is disposed continuously across the areas corresponding to the plurality of pressure chambers 12. The first electrode 60 is longer than the pressure chamber 12 in the Y-axis direction and is disposed continuously across the areas corresponding to the plurality of pressure chambers 12 arranged side by side in the X-axis direction. The first electrode 60 is made of an electrically conductive material, such as gold, silver, copper, palladium, platinum, or titanium.

The piezoelectric layer 70 is disposed continuously in the X-axis direction in a predetermined length in the Y-axis direction. The piezoelectric layer 70 is longer in the Y-axis direction than the pressure chamber 12 in the Y-axis direction, and in this embodiment, longer than the first electrode 60 in the Y-axis direction. For this reason, the piezoelectric layer 70 extends to the outside of the first electrode 60 in the Y-axis direction of the pressure chamber 12, and the end of the first electrode 60 is covered with the piezoelectric layer 70.

The piezoelectric layer 70 is thinner at a portion facing the thin-walled portion 56 of the vibration plate 50 than at the other portion. In this embodiment, the piezoelectric layer 70 has an opening 70*a* at a portion corresponding to the second area P2 of the vibration plate 50. In other words, the piezoelectric layer 70 is not provided at a portion corresponding to the second area P2 of the vibration plate 50.

In this embodiment, the piezoelectric layer 70 is disposed continuously across the area corresponding to the plurality of pressure chambers 12. Alternatively, the piezoelectric layer 70 may be separated on the partition 11 of adjacent pressure chambers 12 for each pressure chamber 12.

The piezoelectric layer 70 is composed of an oxide piezoelectric material having a polarized structure formed on the first electrode 60, for example, perovskite oxide represented by general expression $ABO_3$. Examples of a material for the piezoelectric layer 70 include a lead-based piezoelectric material containing lead and a lead-free piezoelectric material containing no lead.

The second electrodes 80 constituting the individual electrodes of the piezoelectric actuator 300 are provided for the individual pressure chambers 12. The second electrodes 80 are formed in a ring shape along the end of each pressure chamber 12 in plan view seen in the Z-axis direction. In other words, the second electrode 80 has a rectangular peripheral shape with rounded corners that is long in the Y-axis direction, similar to the pressure chamber 12, and has an opening 80*a* with a shape substantially similar to the outer peripheral shape at the center so as to communicate with the opening 70*a* of the piezoelectric layer 70.

The shape of the second electrode 80 defines the range of the active portion 310 in the piezoelectric actuator 300. In other words, since the second electrode 80 is formed in a ring shape along the end of each pressure chamber 12, the active portion 310 of the piezoelectric actuator 300 is disposed in a ring shape along the end of each pressure chamber 12. A material for the second electrode 80 is not limited to a particular material. Examples include electrically conductive materials, such as gold, silver, copper, palladium, platinum, and titanium.

The piezoelectric actuator 300 has a protective film made of an insulating material thereon, on which a common lead electrode coupled to the first electrode 60 and individual lead electrodes coupled to the individual second electrodes are provided.

In the recording head 1 with this piezoelectric actuator 300, when voltage is applied to the first electrode 60 and the second electrode 80 of the piezoelectric actuator 300, the active portion 310 is deflected. The deflection of the active portion 310 causes deflection of the vibration plate 50 to apply pressure to the ink in the pressure chamber 12, thereby ejecting the ink through the nozzle 21.

The vibration plate 50 has the thick-walled portion 55 with a predetermined thickness at an area corresponding to the end of the pressure chamber 12 and the thin-walled portion 56 thinner than the thick-walled portion 55 at the area corresponding to the center of the pressure chamber 12, as described above. In other words, the thick-walled portion 55 having a predetermined thickness along the end of the pressure chamber 12 is provided in a ring shape in the first area P1 of the vibration plate 50 in plan view in the Z-axis direction. In the second area P2 of the vibration plate 50, the thin-walled portion 56 thinner than the thick-walled portion 55 is provided. In other words, a recessed portion 57 in which part of the vibration plate 50 in the thickness direction is removed is formed in a substantially oblong-elliptical shape in the second area P2 of the vibration plate 50, and the portion of the vibration plate 50 corresponding to the recessed portion 57 constitutes the thin-walled portion 56.

In this embodiment, the vibration plate 50 includes the first vibration plate 51, which is a silicon oxide film, and the second vibration plate 52, which is a zirconium oxide film. Of the two layers, the first vibration plate 51 adjacent to the pressure chamber 12 is provided with the recessed portion 57 formed by removing part of the first vibration plate 51, so that the thin-walled portion 56 is formed in the vibration plate 50. The second vibration plate 52 is formed in substantially uniform thickness on the surface of the first vibration plate 51 in which the recessed portion 57 is formed.

Thus, as shown in FIG. 4, the vibration plate 50 has, in the X-axis direction, the thick-walled portion 55 with a predetermined thickness in the first area P1 and the thin-walled portion 56 thinner than the thick-walled portion 55 in the second area P2. As shown in FIG. 5, the vibration plate 50 has, also in the Y-axis direction, the thick-walled portion 55 with a predetermined thickness in the first area P1 and the thin-walled portion 56 thinner than the thick-walled portion 55 in the second area P2.

Since the vibration plate 50 has the thick-walled portion 55 in the first area P1 and the thin-walled portion 56 in the second area P2, as described above, the amount of displacement of the vibration plate 50 can be increased while generation of cracks in the vibration plate 50 when the piezoelectric actuator 300 is driven is eliminated or reduced.

Specifically, the thick-walled portion 55 with a predetermined thickness in the first area P1 of the vibration plate 50 eliminates or reduces the generation of cracks in the vicinity of the end of the pressure chamber 12. In the recording head 1 according to the embodiment of the present disclosure, the piezoelectric actuator 300 includes the ring-shaped active portion 310 along the end of the pressure chamber 12. For this reason, when the piezoelectric actuator 300 is driven, the vibration plate 50 is deformed relatively large in the vicinity of the end of the pressure chamber 12. In particular, the vibration plate 50 is deformed large in the vicinity of the end in the X-axis direction, which is the direction of arrangement of the pressure chambers 12. For this reason, the vibration plate 50 is prone to be cracked in the vicinity of the end of the pressure chamber 12. However, providing the thick-walled portion 55 with a predetermined thickness in the first area P1 of the vibration plate 50 increases the rigidity of the first area P1 of the vibration plate 50, thereby eliminating or reducing the generation of cracks in the vibration plate 50 in the vicinity of the end of the pressure chamber 12. The increase in the rigidity of the first area P1 of the vibration plate 50 increases the resonance frequency, thereby increasing the driving speed of the piezoelectric actuator 300.

The presence of the thin-walled portion 56 thinner than the thick-walled portion 55 in the second area P2 of the vibration plate 50 increases the amount of displacement of the vibration plate 50 due to driving of the piezoelectric actuator 300. The recording head 1 according to the embodiment of the present disclosure does not include the active portion 310 of the piezoelectric actuator 300 in the center of the pressure chamber 12. For this reason, when the piezoelectric actuator 300 is driven, the second area P2 of the vibration plate 50 is unlikely to be cracked but is less deformed. However, the presence of the thin-walled portion 56 in the second area P2 of the vibration plate 50 can increase the amount of deformation of the second area P2 of the vibration plate 50 in driving the piezoelectric actuator 300, thereby increasing the amount of deformation of the entire flexible area P of the vibration plate 50.

The Young's modulus of the vibration plate 50 is smaller than the Young's modulus of the piezoelectric layer 70. The Young's modulus of the vibration plate 50 in this case is the value of the average weighted in proportion of the thicknesses of the layers constituting the vibration plate 50. Since the vibration plate 50 made of a relatively hard material has the thin-walled portion 56, the amount of displacement of the vibration plate 50 when the piezoelectric actuator 300 is driven can be increased more effectively.

The desirable position of the neutral axis differ between the first area P1 of the vibration plate 50 in which the active portion 310 of the piezoelectric actuator 300 is provided and the second area P2 of the vibration plate 50 in which the active portion 310 is not provided. If the thickness of the vibration plate 50 is substantially constant across the flexible area P, it is difficult to set the neutral axes of the first area P1 and the second area P2 at appropriate positions.

However, the vibration plate 50 has the thick-walled portion 55 and the thin-walled portion 56. This configuration allows the neutral axes of the first area P1 and the second area P2 of the vibration plate 50 to be set at appropriate positions. In other words, adjusting the thicknesses or the like of the thick-walled portion 55 and the thin-walled portion 56 allows the neutral axes of the first area P1 and the second area P2 of the vibration plate 50 to be set to appropriate positions. This increases the amount of displacement of the vibration plate 50 when the piezoelectric actuator 300 is driven more effectively.

Thus, the vibration plate 50 has the thick-walled portion 55 in the first area P1 and the thin-walled portion 56 in the second area P2. This configuration allows for increasing the amount of displacement of the vibration plate while eliminating or reducing generation of cracks in the vibration plate 50 when the piezoelectric actuator 300 is driven. This increases the ejection performance while preventing damage to the recording head 1 and increases the durability and reliability of the recording head 1.

In the configuration of this embodiment, the thick-walled portion 55 of the vibration plate 50 is provided in at least part of the first area P1. However, the thick-walled portion 55 may be provided in the widest possible range of the first area P1. In this embodiment, the thick-walled portion 55 is provided continuously across the entire first area P1. In other words, the thick-walled portion 55 is disposed continuously across the first area P1 in both of the X-axis direction and the Y-axis direction. This increases the rigidity of the vibration plate 50 in the first area P1 appropriately.

In this embodiment, the active portion 310 of the piezoelectric actuator 300 extends to above the partition 11 that separates the pressure chambers 12 from each other in both of the X-axis direction and the Y-axis direction. The thick-walled portion 55 of the vibration plate 50 is disposed continuously from the first area P1 to the area on the partition 11 in which the active portion 310 is disposed in both of the X-axis direction and the Y-axis direction. In other words, the active portion 310 of the piezoelectric actuator 300 is disposed only at the portion of the vibration plate 50 corresponding to the thick-walled portion 55.

This causes the distance between the first electrode 60 and the second electrode 80 and the electrical field intensity to be substantially uniform throughout the active portion 310 of the piezoelectric actuator 300. This eliminates or reduces the occurrence of burnout in the active portion 310.

The thin-walled portion 56 only needs to be provided at least part of the second area P2. Alternatively, the thin-walled portion 56 may be disposed in the widest possible range of the second area P2. The thin-walled portion 56 may be disposed continuously to the outside of the second area P2, that is, to the first area P1. Alternatively, the thin-walled portion 56 may be disposed only inside the second area P2. In this embodiment, the thin-walled portion 56 is provided inside the second area P2 in substantially the same size as the second area P2. In other words, almost the whole of the second area P2 of the vibration plate 50 is the thin-walled portion 56. The thin-walled portion 56 of this size increases the amount of displacement of the vibration plate 50 effectively while eliminating or reducing cracks of the vibration plate 50.

The thicknesses of the thick-walled portion 55 and the thin-walled portion 56 are not limited to particular thicknesses and may be determined as appropriate in consideration of, for example, the displacement characteristic of the piezoelectric actuator 300 and the rigidity and the amount of deformation of the vibration plate 50. The thickness of the thin-walled portion 56 may be half or less than the thickness of the thick-walled portion 55. This makes it easier to increase the amount of displacement of the vibration plate 50.

The vibration plate 50 of this embodiment includes the first vibration plate 51 and the second vibration plate 52. However, the vibration plate 50 may have any other configuration. For example, the vibration plate 50 may be constituted by a single layer or three or more layers. To prevent generation of cracks, the vibration plate 50 may be constituted by two or more layers.

Figure 6:
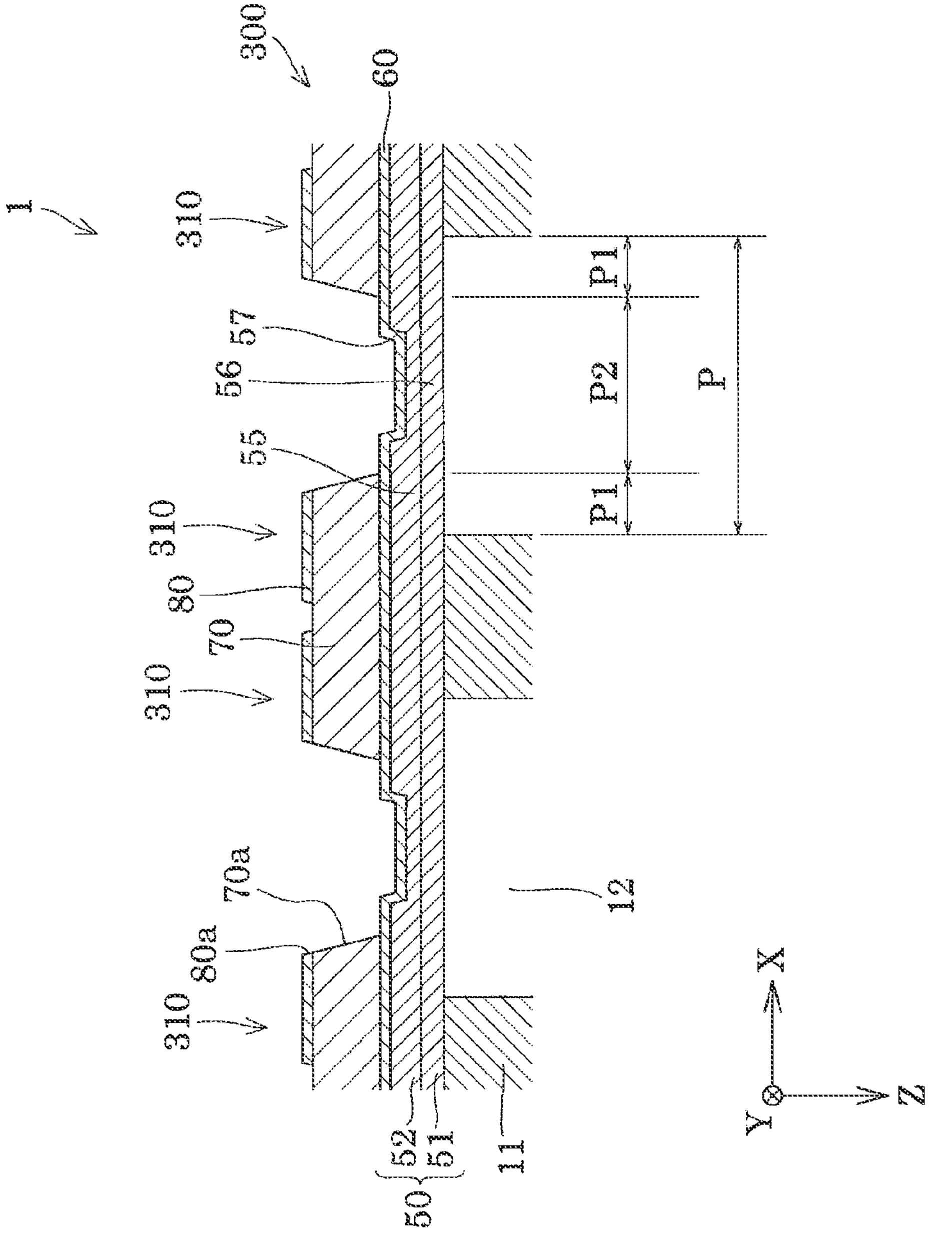
FIG. 6 is a cross-sectional view of a modification of the recording head according to the first embodiment of the present disclosure.

In this embodiment, the vibration plate 50 is provided with the thin-walled portion 56 by removing part of the first vibration plate 51 in the thickness direction to form the recessed portion 57. Alternatively, as shown in FIG. 6, the first vibration plate 51 may have substantially a uniform thickness across the entire surface, and the second vibration plate 52 made of a zirconium oxide film may be provided with the recessed portion 57 formed by removing part thereof in the thickness direction, thereby forming the thin-walled portion 56 of the vibration plate 50.

This configuration of the vibration plate 50 also increases the amount of displacement of the vibration plate 50 while eliminating or reducing the generation of cracks in the vibration plate 50 in driving the piezoelectric actuator 300. Furthermore, providing the recessed portion 57 at the second vibration plate 52 containing zirconium oxide and having a relatively large Young's modulus makes it easier to increase the amount of displacement of the vibration plate 50 in driving the piezoelectric actuator 300.

In this embodiment, the piezoelectric layer 70 has the opening 70*a* at the portion corresponding to the second area P2. This also increases the amount of displacement of the vibration plate 50 in driving the piezoelectric actuator 300. The portion of the piezoelectric layer 70 corresponding to the second area P2 does not have to be completely removed. In some embodiments, the portion is thinner than the other portion. Of course, the opening 70*a* of the piezoelectric layer 70 is not indispensable. In other words, the piezoelectric layer 70 may be disposed over the portion corresponding to the flexible area P.

Second Embodiment

Figure 7:
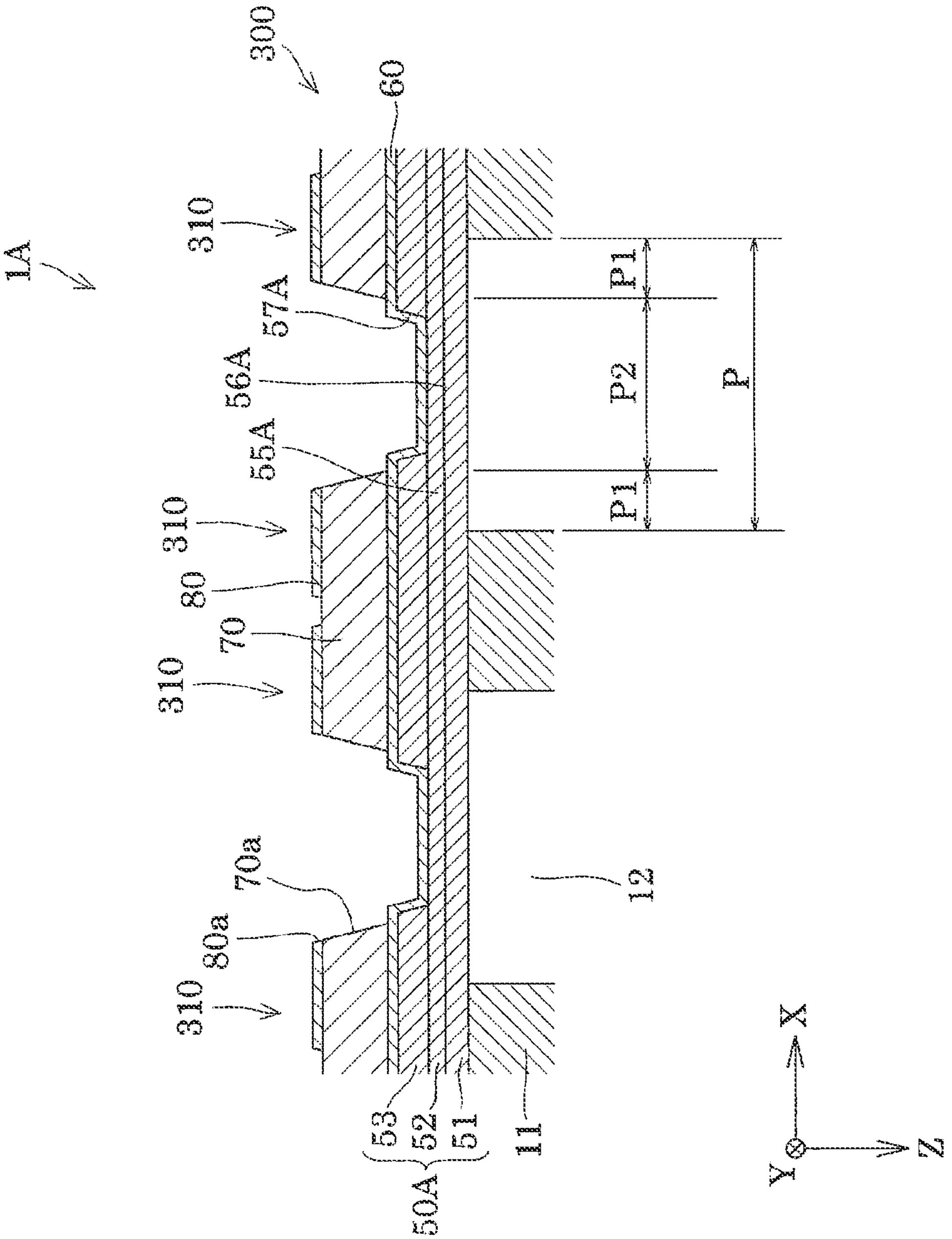
FIG. 7 is a cross-sectional view of the relevant part of a recording head according to a second embodiment of the present disclosure.

FIG. 7 is a cross-sectional view of the relevant part of a recording head according to a second embodiment. The same components as those of the first embodiment are denoted by the same reference signs, and redundant descriptions will be omitted.

As shown in FIG. 7, a vibration plate 50A of a recording head 1A of this embodiment includes a first vibration plate 51, a second vibration plate 52, and a third vibration plate 53 disposed on the negative side of the second vibration plate 52 in the Z-direction. The third vibration plate 53 is provided with a recessed portion 57A to form a thin-walled portion 56A at the vibration plate 50A. The recessed portion 57A passes through the third vibration plate 53 in the thickness direction. Thus, a thick-walled portion 55A of the vibration plate 50A in the first area P1 includes the first vibration plate 51, the second vibration plate 52, and the third vibration plate 53, and the thin-walled portion 56A includes the first vibration plate 51 and the second vibration plate 52. An example material for the third vibration plate 53 is silicon nitride (SiN). A material for the third vibration plate 53 is not limited to a particular material. For example, an adhesive may be employed.

This configuration of the vibration plate 50A also allows increasing the amount of displacement of the vibration plate 50A while eliminating or reducing generation of cracks in the vibration plate 50A in driving the piezoelectric actuator 300, as in the first embodiment.

The vibration plate 50 includes a plurality of films laminated in the thickness direction, in this embodiment, the first vibration plate 51, the second vibration plate 52, and the third vibration plate 53. One of the plurality of films, in this embodiment, the third vibration plate 53, is removed in the thickness direction to form the thin-walled portion 56A. In other words, the recessed portion 57A is formed by removing the third vibration plate 53 in the thickness direction. This allows forming the vibration plate 50A having the thick-walled portion 55A and the thin-walled portion 56A relatively easily, improving mass production performance.

In this embodiment, the recessed portion 57A is formed by removing the third vibration plate 53 in the thickness direction. Alternatively, the recessed portion 57A may be formed by removing another film. For example, the recessed portion 57A may be formed by removing the second vibration plate 52 in the thickness direction. Alternatively, the recessed portion 57A may be formed by removing the third vibration plate 53 and the second vibration plate 52 in the thickness direction.

Third Embodiment

Figure 8:
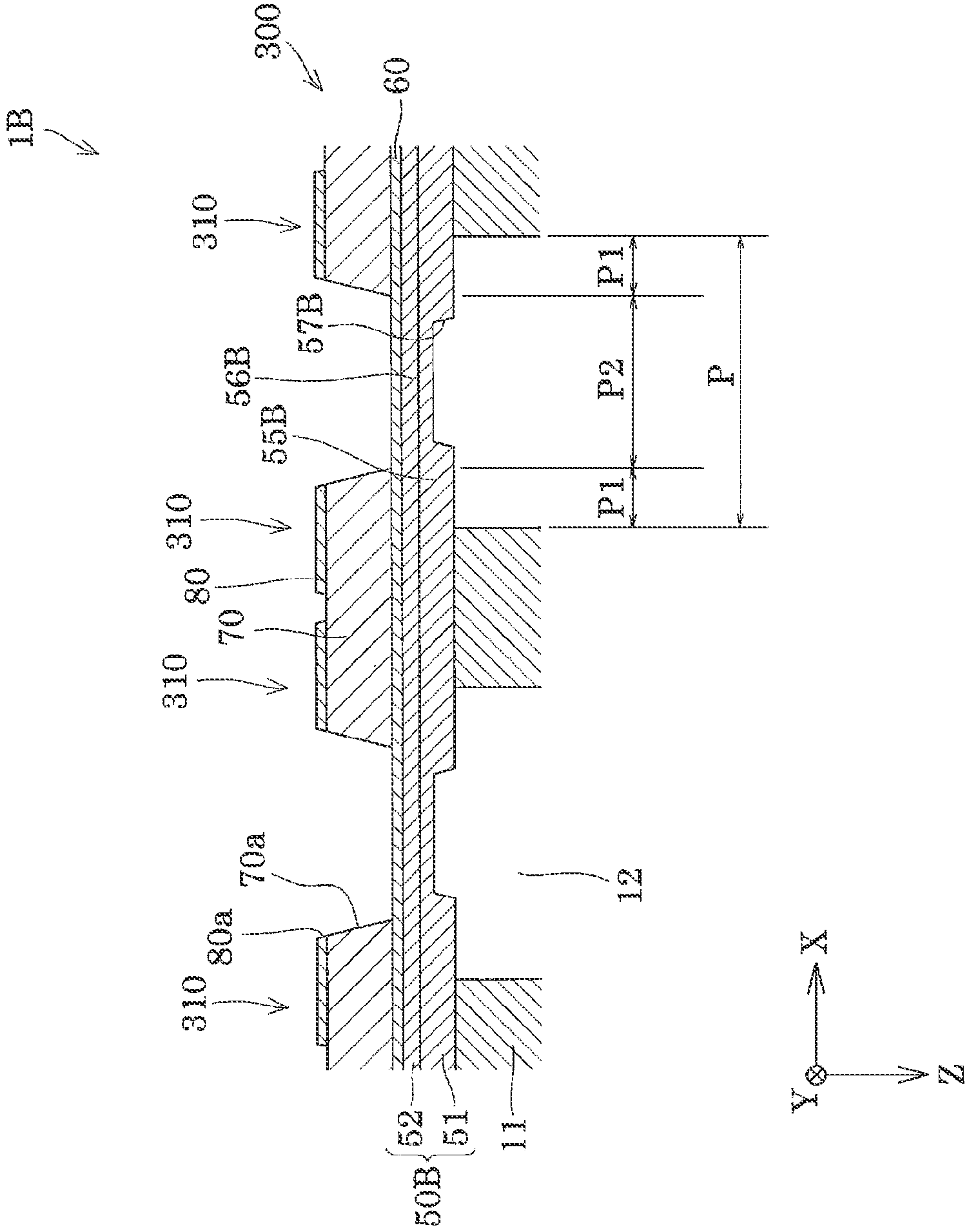
FIG. 8 is a cross-sectional view of the relevant part of a recording head according to a third embodiment of the present disclosure.

FIG. 8 is a cross-sectional view of the relevant part of a recording head according to a third embodiment. The same components as those of the first embodiment are denoted by the same reference signs, and redundant descriptions will be omitted.

As shown in FIG. 8, a vibration plate 50B of the recording head 1B according to this embodiment includes a first vibration plate 51 and a second vibration plate 52, as in the first embodiment. A thin-walled portion 56B is formed by removing part of the first vibration plate 51 in the thickness direction from the pressure chamber 12 side. In other words, the first vibration plate 51 has a recessed portion 57B formed by removing part of the first vibration plate 51 in the thickness direction from the pressure chamber 12 side to thereby form the thin-walled portion 56B and a thick-walled portion 55B.

This configuration of the vibration plate 50B also allows increasing the amount of displacement of the vibration plate 50B while eliminating or reducing generation of cracks in the vibration plate 50B in driving the piezoelectric actuator 300, as in the first embodiment.

Since the thin-walled portion 56B is formed by removing part of the first vibration plate 51 in the thickness direction from the pressure chamber 12 side, in other words, the recessed portion 57B is formed in the surface of the first vibration plate 51 adjacent to the pressure chamber 12, the surface of the vibration plate 50B adjacent to the piezoelectric actuator 300 is flat without unevenness. This facilitates manufacturing the piezoelectric actuator 300, improving the mass production performance.

The surface of the vibration plate 50B adjacent to the piezoelectric actuator 300 does not necessarily have to be flat. For example, the recessed portion 57 may be provided in the surface of the first vibration plate 51 adjacent to the first electrode 60, as in the first embodiment, and the recessed portion 57B may be provided on the surface of the first vibration plate 51 adjacent to the pressure chamber 12.

A method for forming the recessed portion 57B at the first vibration plate 51 is not limited to a particular method. The recessed portion 57B may be formed using an existing technique. For example, in forming the pressure chambers 12 by, for example, anisotropic-etching of the channel-formed substrate 10, the recessed portion 57B is formed by removing the channel-formed substrate 10 to expose the surface of the first vibration plate 51 and then etching the first vibration plate 51 with hydrogen fluoride (HF) or the like.

At that time, a what-is-called correction pattern of a predetermined shape is provided on the surface of the channel-formed substrate 10. This allows forming the pressure chambers 12 on the channel-formed substrate 10 forming the recessed portions 57B at the first vibration plate 51 using one mask pattern.

Fourth Embodiment

Figure 9:
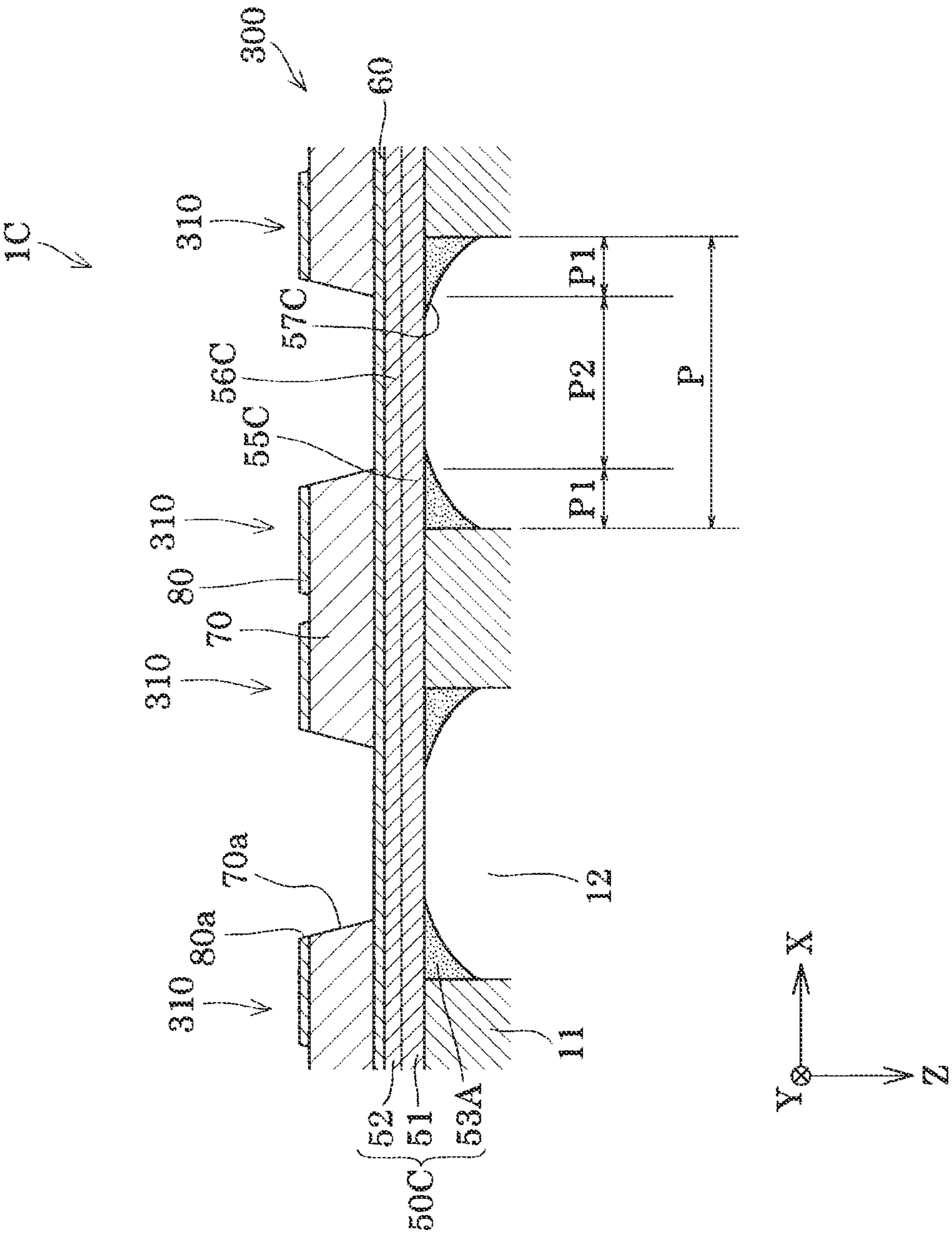
FIG. 9 is a cross-sectional view of the relevant part of a recording head according to a fourth embodiment of the present disclosure.

FIG. 9 is a cross-sectional view of the relevant part of a recording head according to a fourth embodiment. The same components as those of the first embodiment are denoted by the same reference signs, and redundant descriptions will be omitted.

As shown in FIG. 9, in the recording head 1C of this embodiment, the area of a vibration plate 50C facing the pressure chamber 12, that is, the flexible area P, includes a first vibration plate 51, a second vibration plate 52, and a third vibration plate 53A provided on the positive side of the first vibration plate 51 in the Z-direction adjacent to the pressure chamber 12. The third vibration plate 53A is disposed on the surface of the first vibration plate 51 in the pressure chamber 12. The third vibration plate 53A is provided with a recessed portion 57C, so that a thin-walled portion 56C and a thick-walled portion 55C are formed at the vibration plate 50C. The recessed portion 57C passes through the third vibration plate 53A in the thickness direction.

Accordingly, in the configuration of this embodiment, the thick-walled portion 55C provided in the first area P1 of the vibration plate 50C is constituted by the first vibration plate 51, the second vibration plate 52, and the third vibration plate 53A. In contrast, the thin-walled portion 56C in the second area P2 is constituted by the first vibration plate 51 and the second vibration plate 52.

A material for the third vibration plate 53A is not limited particular materials. In this embodiment, a material for the third vibration plate 53A is an adhesive for bonding the common liquid chamber substrate 30 to the channel-formed substrate 10. A method for forming the third vibration plate 53A is also not limited to a particular method. For example, the amount of an adhesive for bonding the common liquid chamber substrate 30 with the channel-formed substrate 10 is increased. This causes the excessive adhesive in bonding the common liquid chamber substrate 30 to the channel-formed substrate 10 to creep up to the first vibration plate 51 along the corners between the pressure chamber 12 and the side wall to form the third vibration plate 53A in the vicinity of the corner between the channel-formed substrate 10 and the first vibration plate 51, that is, the first area P1 of the vibration plate 50C.

That is, the third vibration plate 53A is not formed in the second area P2 of the vibration plate 50C but only in the first area P1 of the vibration plate 50C. In other words, the third vibration plate 53A is formed only in the first area P1 of the vibration plate 50C, and the recessed portion 57C passing through the third vibration plate 53A in the thickness direction is formed in the second area P2 of the vibration plate 50C, so that the portion of the vibration plate 50C corresponding to the recessed portion 57C forms the thin-walled portion 56C. The third vibration plate 53A formed of the adhesive that creeps up the corner of the pressure chamber 12 is thickest at the end of the pressure chamber 12 in the Z-axis direction and decreases in thickness toward the center of the pressure chamber 12. The thickness of the third vibration plate 53A may be substantially constant throughout.

This configuration of the vibration plate 50C allows increasing the amount of displacement of the vibration plate 50C while eliminating or reducing generation of cracks in the vibration plate 50C in driving the piezoelectric actuator 300, as in the first embodiment.

In this embodiment, the third vibration plate 53A is formed of an adhesive. This configuration reduces the influence of the thick-walled portion 55C and the thin-walled portion 56C of the vibration plate 50C on the displacement. This allows the vibration plate 50C to be displaced more appropriately, improving the reliability of the recording head 1.

OTHER EMBODIMENTS

These are embodiments of the present disclosure. The basic configuration of the present disclosure is not limited to the above configurations.

For example, in the above embodiments, the vibration plate includes the thick-walled portion in the first area and the thin-walled portion in the second area in both of the X-axis direction and the Y-axis direction. However, the configuration of the vibration plate in the Y-axis direction is not limited to the above configuration. In other words, the vibration plate may include the thick-walled portion and the thin-walled portion at least in the X-axis direction and does not need to have the thick-walled portion and the thin-walled portion in the Y-axis direction. This configuration also provides the operational effects of increasing the amount of displacement of the vibration plate while eliminating or reducing the generation of cracks in the vibration plate.

In the above embodiments, the first electrode constitutes a common electrode common to the plurality of active portions, and the second electrode constitutes an individual electrode independent for each active portion. Alternatively, the first electrode may constitute the individual electrode, and the second electrode may constitute the common electrode. This also provide the same operational effects as those of the above embodiments because the vibration plate has the thick-walled portion and the thin-walled portion.

Figure 10:
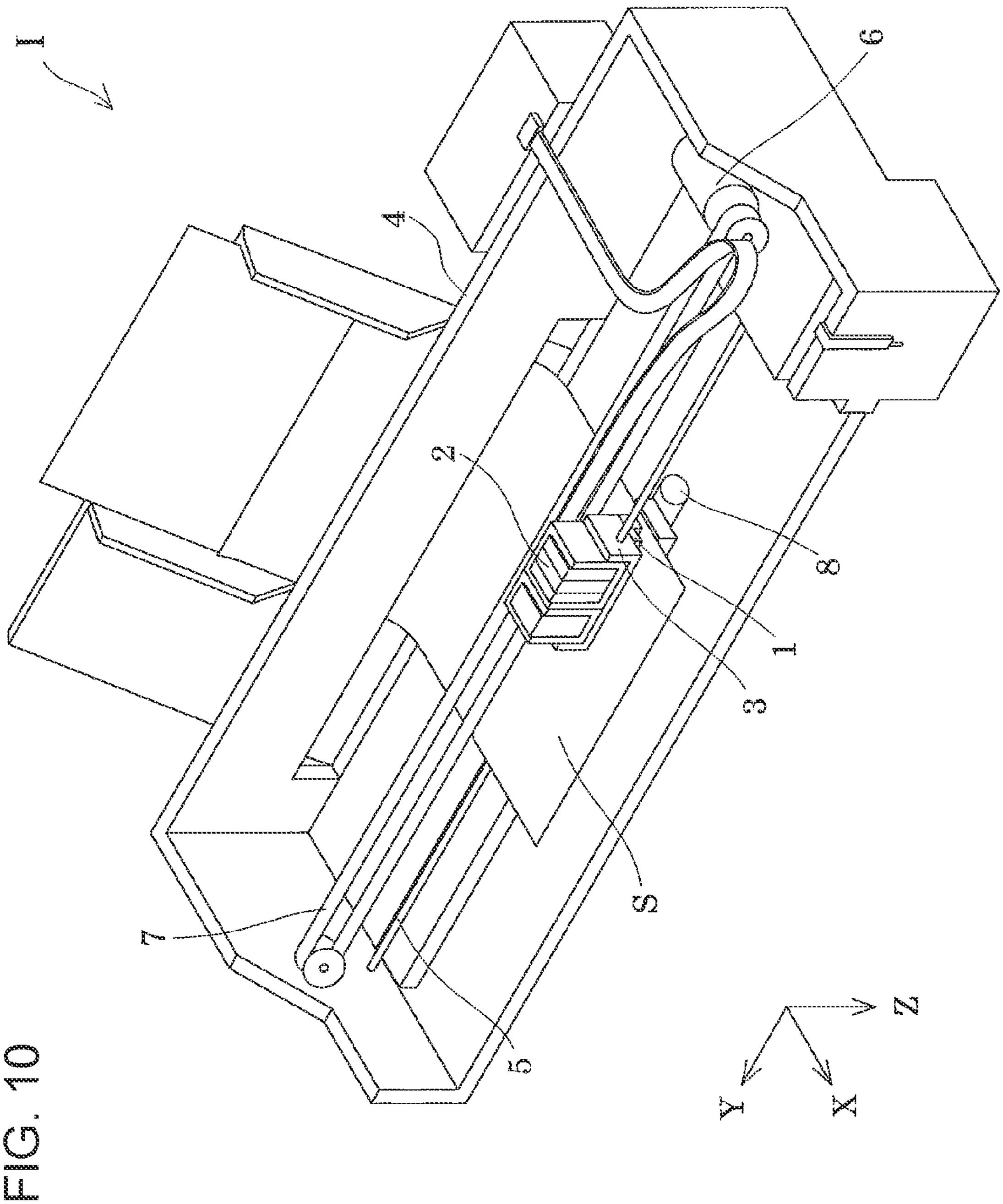
FIG. 10 is a schematic diagram illustrating, in outline, the configuration of a recording apparatus according to an embodiment of the present disclosure.

The recording head 1 of the embodiments is installed in an ink-jet recording apparatus, which is an example of the liquid ejecting apparatus. FIG. 10 is a schematic diagram illustrating an example of the ink-jet recording apparatus, which is an example of a liquid ejecting apparatus according to an embodiment.

In the ink-jet recording apparatus I shown in FIG. 10, the recording head 1 includes a cartridge 2 constituting an ink supply unit, and the cartridge 2 is detachably mounted on the carriage 3. The carriage 3 on which the recording head 1 is mounted is movable along the axis of a carriage shaft 5 attached to an apparatus main body 4.

The carriage 3 fitted with the recording head 1 is moved along the carriage shaft 5 by the driving force of the drive motor 6 transmitted to the carriage 3 via a plurality of gears and a timing belt 7. The apparatus main body 4 is provided with a transport roller 8 serving as a transporter. The transport roller 8 transports a recording sheet S, which is a recording medium, such as paper. The transporter that transports the recording sheet S is not limited to the transport roller 8 and may be a belt, a drum, or the like.

The ink-jet recording apparatus I transports the recording sheet S in the +X-direction with respect to the recording head 1 and ejects ink droplets from recording head 1 while moving the carriage 3 back and forth in the Y-direction with respect to the recording sheet S, thereby landing ink droplets across substantially the entire surface of the recording sheet S, that is, printing.

The ink-jet recording apparatus I is an example in which the recording head 1 is mounted on the carriage 3 and moves back and forth in the Y-direction, which is the main scanning direction. However, this is given for mere illustrative purpose. The present disclosure can also be applied to a what-is-called line recording apparatus that performs printing only by moving a recording sheet S, such as paper, in the X-direction which is a sub-scanning direction, with the recording head 1 fixed.

The above embodiments illustrate an ink-jet recording head as an example of the liquid ejection head and an ink-jet recording apparatus as an example of the liquid ejecting apparatus. However, the present disclosure broadly covers all aspects of liquid ejection heads and liquid ejecting apparatuses and may of course be applied to liquid ejection heads and liquid ejecting apparatuses that eject liquid other than ink. Other examples of the liquid ejection head include various recording heads for use in image recording apparatuses, such as printers, coloring-material ejection heads for use in producing color filters of liquid-crystal displays, electrode-material ejection heads for use in forming electrodes of organic electroluminescence (EL) displays, field emission displays (FEDs), and so on, and living organic material ejection heads for use in producing biochip, as well as liquid ejecting apparatuses including such liquid ejection heads.

What is claimed is:

1. A liquid ejection head comprising:

a channel-formed substrate in which a plurality of pressure chambers communicating with nozzles are arranged side by side;

a vibration plate on one surface of the channel-formed substrate; and a piezoelectric actuator including a first electrode, a piezoelectric layer, and a second electrode laminated on a surface of the vibration plate remote from the pressure chambers, wherein the piezoelectric actuator includes, in a first direction in which the pressure chambers are arranged side by side, an active portion in which the piezoelectric layer is sandwiched between the first electrode and the second electrode in a first area of the vibration plate corresponding to opposite ends of each pressure chamber and does not include the active portion in a second area of the vibration plate corresponding to a center of each pressure chamber, and wherein the vibration plate has, in the first direction, a thick-walled portion with a predetermined thickness in the first area and a thin-walled portion thinner than the thick-walled portion in the second area, and wherein the thin-walled portion is disposed only inside the second area.

2. The liquid ejection head according to claim 1, wherein the thick-walled portion is continuously disposed across the first area in the first direction.

3. The liquid ejection head according to claim 1,
wherein the active portion extends over a partition that separates the pressure chambers, and
wherein the thick-walled portion continues from an area facing each pressure chamber to an area in which the active portion on the partition is provided.

4. The liquid ejection head according to claim 1,
wherein the vibration plate includes a zirconium oxide film containing zirconium oxide, and
wherein at least the zirconium oxide film of the thin-walled portion is thinner than the thick-walled portion.

5. The liquid ejection head according to claim 1, wherein Young's modulus of the vibration plate is lower than Young's modulus of the piezoelectric layer.

6. The liquid ejection head according to claim 1, wherein the piezoelectric layer is thinner at a portion facing the thin-walled portion of the vibration plate than at another portion.

7. The liquid ejection head according to claim 1,
wherein the piezoelectric actuator includes, also in a second direction crossing the direction in which the pressure chambers are arranged side by side, the active portion in the first area and does not include the active portion in the second area, and
wherein the vibration plate has, also in the second direction, the thick-walled portion in the first area and the thin-walled portion in the second area.

8. The liquid ejection head according to claim 1,
wherein the vibration plate includes a plurality of films laminated in a thickness direction, and
wherein the thin-walled portion is formed by removing one of the plurality of films in the thickness direction.

9. The liquid ejection head according to claim 1, wherein the thin-walled portion is formed by removing part of the vibration plate adjacent to the pressure chamber.

10. A liquid ejecting apparatus comprising the liquid ejection head according to claim 1.

11. A liquid ejection head comprising:
a channel-formed substrate in which a plurality of pressure chambers communicating with nozzles are arranged side by side;
a vibration plate on one surface of the channel-formed substrate; and
a piezoelectric actuator including a first electrode, a piezoelectric layer, and a second electrode laminated on a surface of the vibration plate remote from the pressure chambers,
wherein the piezoelectric actuator includes, in a first direction in which the pressure chambers are arranged side by side, an active portion in which the piezoelectric layer is sandwiched between the first electrode and the second electrode in a first area of the vibration plate corresponding to opposite ends of each pressure chamber and does not include the active portion in a second area of the vibration plate corresponding to a center of each pressure chamber,
wherein the vibration plate has, in the first direction, a thick-walled portion with a predetermined thickness in the first area and a thin-walled portion thinner than the thick-walled portion in the second area, and
wherein Young's modulus of the vibration plate is lower than Young's modulus of the piezoelectric layer.

12. The liquid ejection head according to claim 11,
wherein the piezoelectric actuator includes, also in a second direction crossing the direction in which the pressure chambers are arranged side by side, the active portion in the first area and does not include the active portion in the second area, and
wherein the vibration plate has, also in the second direction, the thick-walled portion in the first area and the thin-walled portion in the second area.

13. The liquid ejection head according to claim 11,
wherein the vibration plate includes a zirconium oxide film containing zirconium oxide, and
wherein at least the zirconium oxide film of the thin-walled portion is thinner than the thick-walled portion.

14. A liquid ejecting apparatus comprising the liquid ejection head according to claim 11.

15. A liquid ejection head comprising:
a channel-formed substrate in which a plurality of pressure chambers communicating with nozzles are arranged side by side;
a vibration plate on one surface of the channel-formed substrate; and
a piezoelectric actuator including a first electrode, a piezoelectric layer, and a second electrode laminated on a surface of the vibration plate remote from the pressure chambers,
wherein the piezoelectric actuator includes, in a first direction in which the pressure chambers are arranged side by side, an active portion in which the piezoelectric layer is sandwiched between the first electrode and the second electrode in a first area of the vibration plate corresponding to opposite ends of each pressure chamber and does not include the active portion in a second area of the vibration plate corresponding to a center of each pressure chamber,
wherein the vibration plate has, in the first direction, a thick-walled portion with a predetermined thickness in the first area and a thin-walled portion thinner than the thick-walled portion in the second area, and
wherein the piezoelectric layer is thinner at a portion facing the thin-walled portion of the vibration plate than at another portion.

16. The liquid ejection head according to claim 12,
wherein the piezoelectric actuator includes, also in a second direction crossing the direction in which the pressure chambers are arranged side by side, the active portion in the first area and does not include the active portion in the second area, and
wherein the vibration plate has, also in the second direction, the thick-walled portion in the first area and the thin-walled portion in the second area.

17. The liquid ejection head according to claim 12,
wherein the vibration plate includes a zirconium oxide film containing zirconium oxide, and
wherein at least the zirconium oxide film of the thin-walled portion is thinner than the thick-walled portion.

18. A liquid ejecting apparatus comprising the liquid ejection head according to claim 12.

* * * * *